J. FLEMING.

Improvement in Mode of Securing Handles to Tin-Cups, &c.

No. 131,261.  Patented Sep. 10, 1872.

Witnesses.
Wm. W. S. Dyre.
Jno. D. Patten

Inventor:
John Fleming
By J. J. Johnston & Bro
his attorneys

UNITED STATES PATENT OFFICE.

JOHN FLEMING, OF PITTSBURG, PENNSYLVANIA.

IMPROVEMENT IN MODES OF SECURING HANDLES TO TIN CUPS, &c.

Specification forming part of Letters Patent No. 131,261, dated September 10, 1872.

*To all whom it may concern:*

Be it known that I, JOHN FLEMING, of Pittsburg, in the county of Allegheny and State of Pennsylvania, have invented a new and useful Improvement in Securing Handles to Tin Cups and other vessels; and I do hereby declare that the following is a full, clear, and exact description thereof, reference being had to the accompanying drawing and to the letters of reference marked thereon.

My invention relates to securing the handle upon tin cups and other vessels, and consists in making in the body of the cup or vessel two apertures, into which are placed the ends of the handle, which is bent down against the inner wall of the cup or vessel and then secured by soldering.

To enable others skilled in the art to make and use my invention, I will proceed to describe its construction and application.

Figure 1:
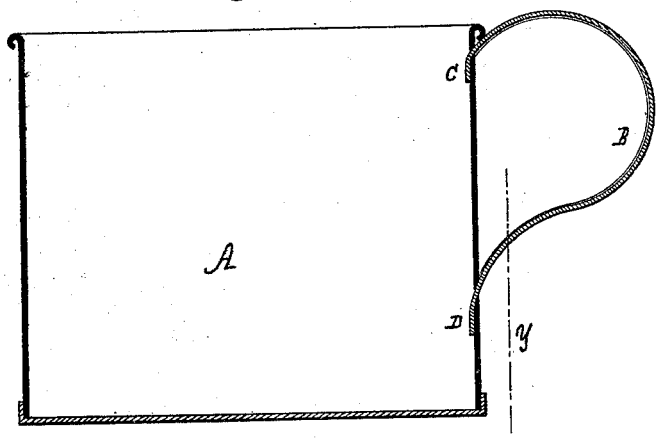
Figure 2:
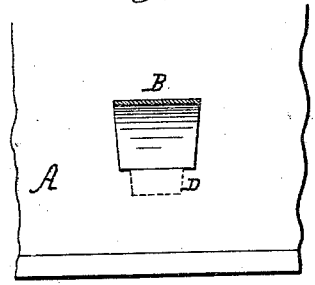

In the accompanying drawing, which forms part of my specification, Figure 1 is a transverse and vertical section of an ordinary tin cup, representing the handle secured to it by my improved method. Fig. 2 is a section at line *y* of Fig. 1.

A represents the body of the tin cup, which is of ordinary construction. B represents the handle, which is constructed in the usual manner, having the desired form or curvature given to it. In the side of the cup are made two apertures, into which are inserted the ends of handle B, which are bent down against the inner wall of the body A, as shown at C and D. These ends are then soldered to the side of the cup A, thereby firmly securing the handle to the cup with ease and great facility, avoiding the necessity of rivets and the labor and trouble attendant upon the riveting process hitherto practiced.

Having thus described my improvement what I claim as of my invention is, first—

1. The handle secured to a tin cup or other vessel by placing the ends of the handle in apertures and bending them back against, and soldering them to, the inner wall of the cup or vessel, substantially as herein described.

2. A new article of manufacture, viz: a tin cup with its handle secured to the body of the cup, in manner substantially as herein described.

JOHN FLEMING.

Witnesses:
   A. C. JOHNSTON,
   JAMES J. JOHNSTON.